United States Patent
Omanovic et al.

(10) Patent No.: US 11,686,936 B2
(45) Date of Patent: *Jun. 27, 2023

(54) ROTATIONALLY ADJUSTABLE HEAD UP DISPLAY

(71) Applicant: Panasonic Automotive Systems Company of America, Division of Panasonic Corporation of North America, Peachtree City, GA (US)

(72) Inventors: Edo Omanovic, Livonia, MI (US); Patrick M. O'Connell, Novi, MI (US)

(73) Assignee: Panasonic Automotive Systems Company of America, Division of Panasonic Corporation of North America, Peachtree City, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/452,377

(22) Filed: Oct. 26, 2021

(65) Prior Publication Data

US 2022/0043260 A1 Feb. 10, 2022

Related U.S. Application Data

(63) Continuation of application No. 16/680,839, filed on Nov. 12, 2019, now Pat. No. 11,181,738.

(60) Provisional application No. 62/760,969, filed on Nov. 14, 2018.

(51) Int. Cl.
G02B 27/01 (2006.01)
G03B 21/14 (2006.01)
B60K 35/00 (2006.01)

(52) U.S. Cl.
CPC ....... *G02B 27/0101* (2013.01); *G03B 21/145* (2013.01); *B60K 35/00* (2013.01); *B60K 2370/1529* (2019.05)

(58) Field of Classification Search
CPC .... G03B 21/008; G03B 21/28; G03B 21/145; G03B 21/2013; G03B 21/2033; G03B 21/2053; B60K 2370/23; B60K 2370/31; B60K 2370/67; B60K 2370/126; B60K 2370/152; B60K 2370/334; B60K 2370/1438; B60K 2370/1529; G02B 27/01; G02B 27/09; G02B 27/0101; G02B 27/0179; G02B 27/0977; G02B 27/0983; G02B 27/10; G02B 27/18
See application file for complete search history.

(56) References Cited

U.S. PATENT DOCUMENTS

| | | | |
|---|---|---|---|
| 2005/0163558 A1* | 7/2005 | Lee | F16M 11/10 403/45 |
| 2016/0266391 A1* | 9/2016 | Han | G09G 3/001 |
| 2018/0217376 A1* | 8/2018 | Yagi | G02B 5/04 |

(Continued)

*Primary Examiner* — Sultan Chowdhury
(74) *Attorney, Agent, or Firm* — Laurence S. Roach, Esq.

(57) ABSTRACT

A head up display mirror holder arrangement for a motor vehicle includes a picture generation unit producing a light field. A mirror reflects the light field such that the light field is visible to the driver as a virtual image. A mirror holder has two opposite ends and an activation feature. The two opposite ends are aligned along a rotational axis of the mirror. The mirror holder retains the mirror. Each of two bushings is coupled to a respective opposite end of the mirror holder. A calibration switch has minimum proximity to the activation feature of the mirror holder.

20 Claims, 3 Drawing Sheets

(56) References Cited

U.S. PATENT DOCUMENTS

2020/0388079 A1\* 12/2020 Lambert .............. H04N 13/383
2021/0263325 A1\* 8/2021 Yuan ..................... B60K 35/00

\* cited by examiner

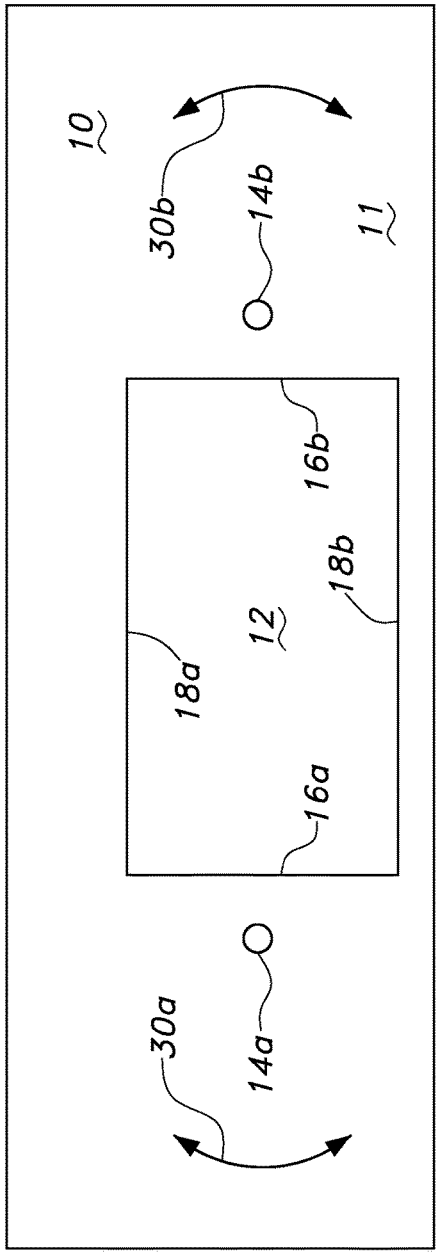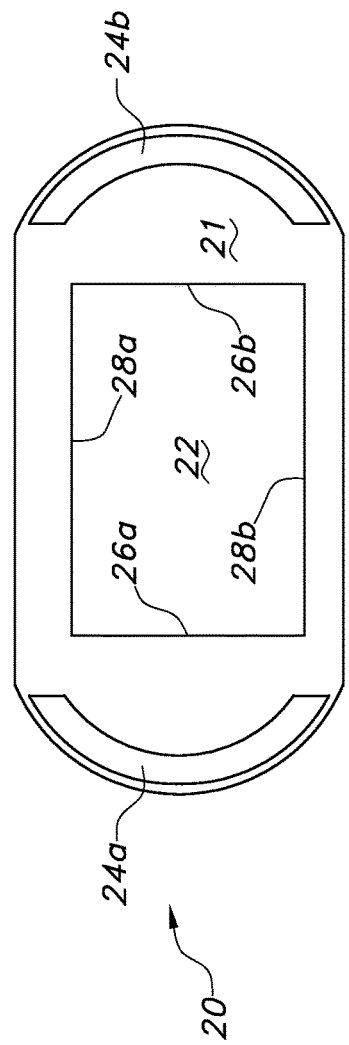

ROTATIONALLY ADJUSTABLE HEAD UP DISPLAY

CROSS-REFERENCED TO RELATED APPLICATIONS

This application is a continuation of U.S. patent application Ser. No. 16/680,839, filed on Nov. 12, 2019, which is currently under allowance, which claims benefit of U.S. Provisional Application No. 62/760,969 filed on Nov. 14, 2018, the disclosure of which are hereby incorporated by reference in their entirety for all purposes.

FIELD OF THE INVENTION

The disclosure relates to a head up display (HUD) system in a motor vehicle.

BACKGROUND OF THE INVENTION

A head up display emits light that reflects off of one or more mirrors and from the front windshield to be seen by the driver. The light appears to come from a virtual image in front of the driver and in front of the windshield. This type of head up display is currently commercially available.

Conventional head up displays create the virtual image by first using a display to create an image. Next, the light from the image is reflected from one or more mirrors. Next, the light from the mirrors is reflected from the windshield. The mirrors are designed and positioned relative to the display so that the light seen by the driver, which is reflected from the windshield, appears to come from a virtual image that is outside of the vehicle. The mirrors and display are typically contained in a package that occupies a volume beneath the top surface of the dashboard.

In Head Up Displays (HUDs), optics need to be precisely placed. Currently, the positions of the optical elements must be fixed, and do not have much flexibility. However, due to variances in vehicles across different car lines, differences in the positions of the optical elements (e.g., windshield, etc.) can cause rotation of the virtual image. Across multiple vehicle lines, there may be unwanted rotation of the virtual image, which has to be corrected electronically. If the rotation is too great, even electronics cannot correct it completely.

One electronic correcting method is predistortion, which may include electrically rotating the image that is being shown. This has limitations because more of the LCD (Liquid Crystal Display) is used by rotating the image, and there is a limit to how much of the LCD can be used.

SUMMARY

The present invention may provide a rotatable PGU (Picture Generation Unit) that enables mechanical rotation of a display to correct for optical deficiencies in the system. In addition to optical improvements, the inventive system adds flexibility in packaging a display into a tighter area by enabling the display to rotate away from tight spaces.

By enabling the display to rotate, the invention can fix rotation of the virtual image and minimize scrap caused by parts that are out of specification. Thus, the invention may enable a common HUD housing to be used in multiple vehicles, which reduces cost. The invention may provide flexibility in the location of the PGU, which may interfere in one vehicle but not in another. Basically, the position of the PGU may be different in different vehicles without any added costs to tooling.

In one embodiment, the invention comprises a head up display arrangement for a motor vehicle. The arrangement includes a first body having a picture generation unit producing a light field that is reflected off of a windshield of the motor vehicle such that the light field is visible to a human driver of the motor vehicle as a virtual image. The first body also includes either a pair of arcuate recesses or a pair of projections. A second body is fixed to a frame of the motor vehicle. The second body includes either a pair of arcuate recesses each positioned and sized to receive a respective projection of the first body, or a pair of projections each positioned and sized to be received in a respective arcuate recess of the first body.

In another embodiment, the invention comprises a head up display method for a motor vehicle, including using a picture generation unit to produce a light field that is reflected off of a windshield of the motor vehicle such that the light field is visible to a human driver of the motor vehicle as a virtual image. A first body is provided including the picture generation unit and either a pair of arcuate recesses or a pair of projections. A second body is fixed to a frame of the motor vehicle. The second body includes either a pair of arcuate recesses if the first body includes the projections, or a pair of projections if the first body includes the recesses. The first body and the second body are mated together such that each of the projections is received in a respective arcuate recess. The first body is rotated relative to the second body until the virtual image is in a desired rotational position. The first body is fixed relative to the frame of the motor vehicle after the rotating step.

In yet another embodiment, the invention comprises a head up display arrangement for a motor vehicle, including at least one mirror, a windshield, and a first body including a picture generation unit producing a light field that is reflected off of the at least one mirror and the windshield such that the light field is visible to a human driver of the motor vehicle as a virtual image. The first body also includes either a pair of arcuate recesses or a pair of projections. A second body is fixed to a frame of the motor vehicle. The second body includes a window allowing the light field to pass through the window before the light field is reflected by the at least one mirror. The second body further includes either a pair of arcuate recesses each positioned and sized to receive a respective projection of the first body, or a pair of projections each positioned and sized to be received in a respective arcuate recess of the first body.

An advantage of the present invention is that it may provide increased tolerance in the positions of the optical elements.

BRIEF DESCRIPTION OF THE DRAWINGS

A better understanding of the present invention will be had upon reference to the following description in conjunction with the accompanying drawings.

FIG. 1 is a plan view of one embodiment of a HUD base plate of the present invention.

FIG. 2 is a plan view of one embodiment of a PGU display mount of the present invention.

DETAILED DESCRIPTION OF THE PREFERRED EMBODIMENTS

Figure 3:
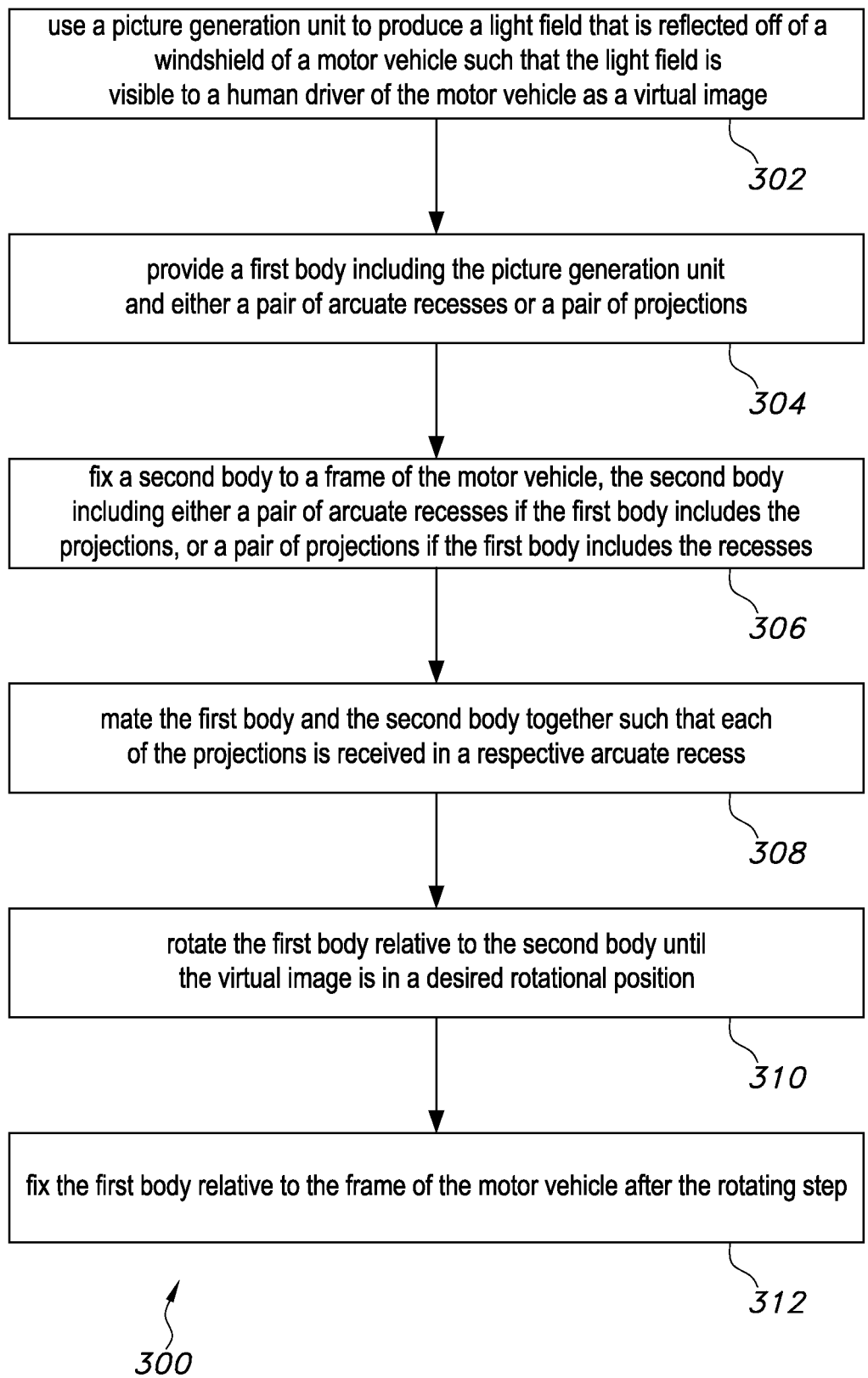
FIG. 3 is a flow chart of one embodiment of a head up display method of the present invention for a motor vehicle.

FIG. 1 illustrates one embodiment of a HUD base plate 10 of the present invention, including a body 11 having a display window 12 and projections in the form of locator pins 14a-b. Locator pins 14a-b may be cylindrically-shaped and may project out of the page of FIG. 1 towards the viewer. Pins 14a-b may be symmetrically disposed on opposite sides of window 12. That is, each of pins 14a-b may be equidistant from a respective one of lateral edges 16a-b of window 12, and each of pins 14a-b may be equidistant from vertical edges 18a-b of window 12.

FIG. 2 illustrates one embodiment of a PGU display mount 20 of the present invention, including a body 21 including a PGU display 22 and recesses in the form of crescent-shaped or arcuate through-slots 24a-b. Through-slots 24a-b may be symmetrically disposed on opposite sides of display 22. That is, each of through-slots 24a-b may be equidistant from a respective one of lateral edges 26a-b of display 22, and each of two opposite ends of each of through-slots 24a-b may extend by an equal distance beyond a respective one of vertical edges 28a-b of display 22.

Each of through-slots 24a-b may be sized to receive a respective one of pins 14a-b therethrough. For example, through-slot 24a may receive pin 14a, and through-slot 24b may receive pin 14b. Window 12 may be larger than display 22 in terms of both height and width.

During assembly, PGU display mount 20 is placed onto locator pins 14a-b, which allows rotation of display 22 across window 12 due to arcuate through-slots 24a-b. The rotation may be in either of two opposite rotational directions indicated by double arrows 30a-b. Once the virtual image of the HUD is perfect or at least acceptable, PGU display mount 20 can be screwed down to or adhered to the HUD, or to HUD base plate 10 in particular, so as to no longer be movable relative to the HUD or to the remainder of the motor vehicle in which mount 20 is installed.

The invention may provide the capability to correct the rotation of the virtual image at the end of the assembly line. As the display is mounted to the HUD, the perfect rotational position for each unit may be found by using a camera. Once the rotational position of the image is perfect, PGU display mount 20 may then be screwed into or otherwise fixed to the HUD unit and, by extension, to the frame of the vehicle.

The invention has been described as the PGU being attached to a body having recesses in the form of arcuate slots. However, it is also possible within the scope of the invention for the PGU to be attached to a body having projections that are received in recesses of a fixed body, such as a HUD base plate. Moreover, although the recesses have been shown in the form of through-slots, in another embodiment the recesses may be grooves in the face of a plate.

FIG. 3 illustrates one embodiment of a head up display method 300 of the present invention for a motor vehicle. In a first step 302, a picture generation unit is used to produce a light field that is reflected off of a windshield of the motor vehicle such that the light field is visible to a human driver of the motor vehicle as a virtual image. For example, as illustrated below in FIG. 4, light 423 from LCD 422 may be reflected by mirrors 430, 432 and windshield 414 toward a user 434 such that the light 423 may appear to user 434 as a virtual image 436.

Next, in step 304, a first body is provided including the picture generation unit and either a pair of arcuate recesses or a pair of projections. For example, a PGU display mount 420 including LCD 422 may have either a pair of arcuate recesses similar to arcuate through-slots 24a-b, or a pair of projections similar to locator pins 14a-b.

In a next step 306, a second body is fixed to a frame of the motor vehicle. The second body includes either a pair of arcuate recesses if the first body includes the projections, or a pair of projections if the first body includes the recesses. For example, HUD base plate 410 may be fixed to a frame of the motor vehicle. HUD base plate 410 may include either a pair of arcuate recesses similar to arcuate through-slots 24a-b if PGU display mount 420 includes the projections, or a pair of projections similar to locator pins 14a-b if PGU display mount 420 includes the recesses.

In step 308, the first body and the second body are mated together such that each of the projections is received in a respective arcuate recess. For example, HUD base plate 410 and PGU display mount 420 may be mated together such that each of the projections is received in a respective arcuate recess, regardless of which one of HUD base plate 410 and PGU display mount 420 includes the projections and which one includes the recesses.

In a next step 310, the first body is rotated relative to the second body until the virtual image is in a desired rotational position. For example, PGU display mount 420 may be rotated relative to HUD base plate 410 about an axis parallel to the direction of light 423 until virtual image 436 appears to a viewer 434 to be level and not tilted. It is also possible for a human viewer 434 to be replaced by an optics measurement apparatus for evaluating whether virtual image 436 appears to be level and not tilted.

In a final step 312, the first body is fixed relative to the frame of the motor vehicle after the rotating step. For example, PGU display mount 420 may be screwed to HUD base plate 410 or otherwise fixedly attached to a nonmoving part of the motor vehicle such that PGU display mount 420 and HUD base plate 410 are fixed relative to each other.

Figure 4:
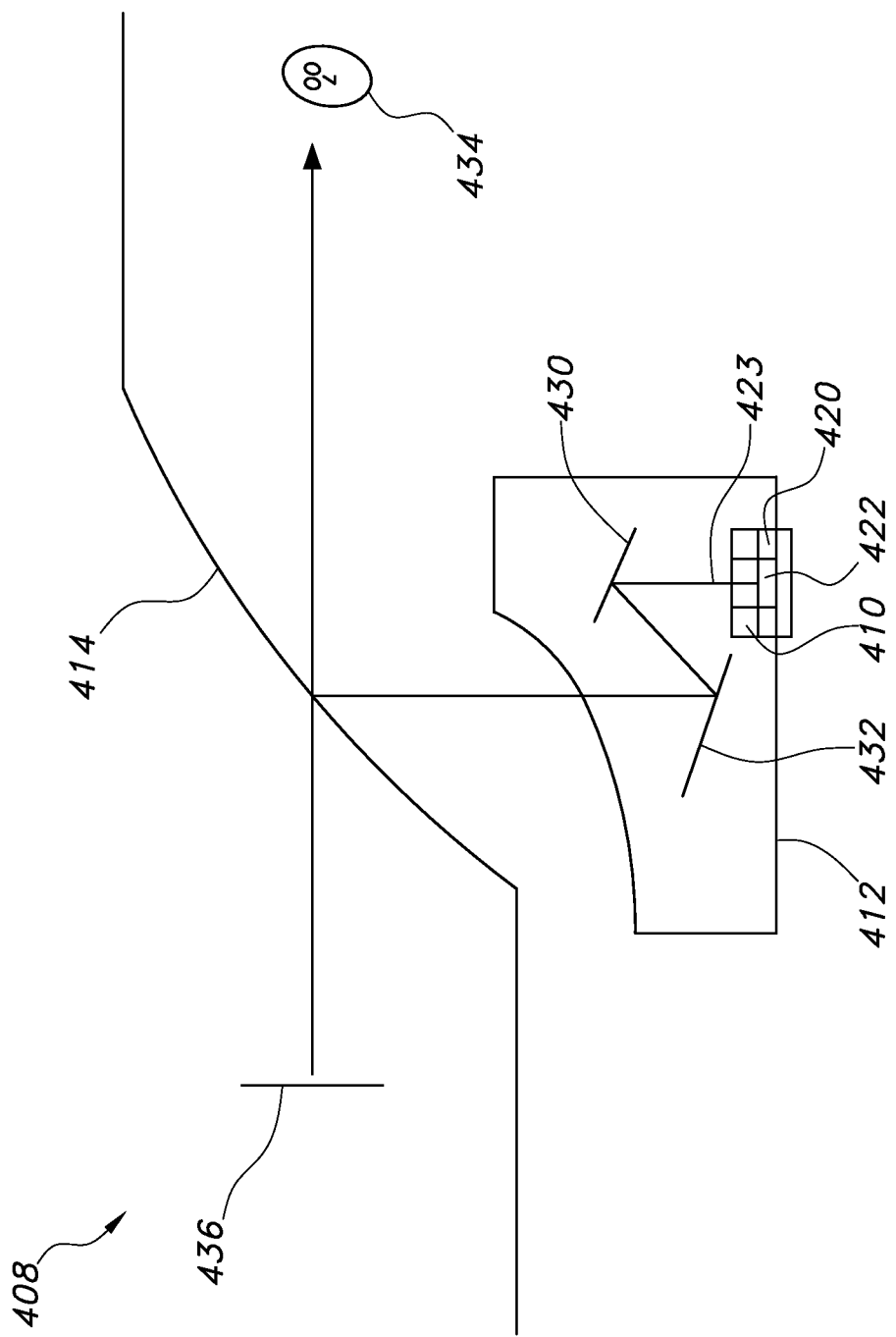
FIG. 4 is a schematic side view of one embodiment of an automotive head up display arrangement of the present invention.

FIG. 4 illustrates one embodiment of an automotive head up display arrangement 408 of the present invention, including a HUD module 412 and a windshield 414. HUD module 412 includes a picture generation unit (PGU) in the form of LCD 422, a first mirror 430, and a second mirror 432.

During use, light 423 from LCD 422 may be reflected by mirrors 430, 432 and windshield 414 toward a user 434. Light 423 may appear to user 434 as a virtual image 436.

The foregoing description may refer to "motor vehicle", "automobile", "automotive", or similar expressions. It is to be understood that these terms are not intended to limit the invention to any particular type of transportation vehicle. Rather, the invention may be applied to any type of transportation vehicle whether traveling by air, water, or ground, such as airplanes, boats, etc.

The foregoing detailed description is given primarily for clearness of understanding and no unnecessary limitations are to be understood therefrom for modifications can be made by those skilled in the art upon reading this disclosure and may be made without departing from the spirit of the invention.

What is claimed is:

1. A head up display arrangement for a motor vehicle, the arrangement comprising:
   a first body including:
   a picture generation unit configured to produce a light field that is reflected off of a windshield of the motor vehicle such that the light field is visible to a human driver of the motor vehicle as a virtual image; and at least one arcuate recess and/or at least one projection; and a second body configured to be fixed to a frame of the motor vehicle, the second body including:

at least one recess positioned and sized to receive a respective said projection of the first body; and/or at least one projection positioned and sized to be received in a respective said arcuate recess of the first body.

2. The head up display arrangement of claim 1 wherein the first body includes a pair of arcuate slots, the slots being disposed on opposite sides of the picture generation unit.

3. The head up display arrangement of claim 1 wherein the first body includes a pair of projections, the projections being disposed on opposite sides of the picture generation unit.

4. The head up display arrangement of claim 1 wherein the arcuate recess comprises an arcuate through-slot.

5. The head up display arrangement of claim 1 wherein the arcuate recess comprises an arcuate groove in a face of the first body and/or a face of the second body.

6. The head up display arrangement of claim 1 wherein the projection comprises a pin.

7. The head up display arrangement of claim 1 wherein the second body includes a window sized and positioned to enable the light field to pass therethrough.

8. A head up display method for a motor vehicle, said method comprising:

using a picture generation unit to produce a light field that is reflected off of a windshield of the motor vehicle such that the light field is visible to a human driver of the motor vehicle as a virtual image;

providing a first body including:

the picture generation unit; and at least one arcuate recess and/or at least one projection;

fixing a second body to a frame of the motor vehicle, the second body including:

at least one arcuate recess if the first body includes the at least one projection; and/or at least one projection if the first body includes the at least one recess;

mating the first body and the second body together such that each said projection is received in a respective said arcuate recess;

rotating the first body relative to the second body until the virtual image is in a desired rotational position; and fixing the first body relative to the frame of the motor vehicle after the rotating step.

9. The head up display method of claim 8 wherein the first body includes a pair of arcuate slots, the slots being disposed on opposite sides of the picture generation unit.

10. The head up display method of claim 8 wherein the first body includes a pair of projections, the projections being disposed on opposite sides of the picture generation unit.

11. The head up display method of claim 8 wherein the arcuate recess comprises an arcuate through-slot.

12. The head up display method of claim 8 wherein the arcuate recess comprises an arcuate groove in either a face of the first body and/or a face of the second body.

13. The head up display method of claim 8 wherein the projection comprises a pin.

14. The head up display method of claim 8 wherein the second body includes a window, the method further comprising emitting the light field through the window before the light field is reflected by the windshield.

15. The head up display method of claim 8 wherein the first body is fixed relative to the frame of the motor vehicle by screwing the first body to the second body.

16. A head up display arrangement for a motor vehicle, the arrangement comprising:

at least one mirror;

a windshield;

a first body including:

a picture generation unit configured to produce a light field that is reflected off of the at least one mirror and the windshield such that the light field is visible to a human driver of the motor vehicle as a virtual image; and at least one arcuate recess and/or at least one projection; and a second body configured to be fixed to a frame of the motor vehicle, the second body including a window configured to allow the light field to pass through the window before the light field is reflected by the at least one mirror, the second body further including:

at least one arcuate recess positioned and sized to receive a respective said projection of the first body; and/or at least one projection positioned and sized to be received in a respective said arcuate recess of the first body.

17. The head up display arrangement of claim 16 wherein the first body includes a pair of arcuate slots, the slots being disposed on opposite sides of the picture generation unit.

18. The head up display arrangement of claim 16 wherein the first body includes a pair of projections, the projections being disposed on opposite sides of the picture generation unit.

19. The head up display arrangement of claim 16 wherein the arcuate recess comprises an arcuate through-slot.

20. The head up display arrangement of claim 16 wherein the arcuate recess comprises an arcuate groove in either a face of the first body or a face of the second body.

* * * * *